United States Patent [19]

Cottrell et al.

[11] Patent Number: 4,688,181
[45] Date of Patent: Aug. 18, 1987

[54] IMAGE TRANSFORMATIONS ON AN INTERACTIVE RASTER SCAN OR MATRIX DISPLAY

[75] Inventors: Roger L. Cottrell, Menlo Park, Calif.; Alan S. Murphy, Eastleigh, England

[73] Assignee: International Business Machines Corporation, Armonk, N.Y.

[21] Appl. No.: 859,845

[22] Filed: Apr. 30, 1986

Related U.S. Application Data

[63] Continuation of Ser. No. 537,996, Sep. 30, 1983, abandoned.

[30] Foreign Application Priority Data

Dec. 22, 1982 [EP] European Pat. Off. ........ 82306863.0

[51] Int. Cl.$^4$ .......................... G06F 15/60; G09G 1/06
[52] U.S. Cl. .................................. 364/521; 364/518; 358/183; 340/747; 340/724
[58] Field of Search ................ 364/518, 521; 340/709, 340/725, 731, 744, 747, 739, 724, 734; 358/183

[56] References Cited

U.S. PATENT DOCUMENTS

| | | | |
|---|---|---|---|
| 3,723,803 | 3/1973 | Harrison, III et al. | 340/725 |
| 4,121,228 | 10/1978 | Cowe et al. | 340/731 X |
| 4,122,438 | 10/1978 | Bird | 340/731 X |
| 4,125,873 | 11/1978 | Chesarek | 340/747 X |
| 4,228,430 | 10/1980 | Iwamura et al. | 340/709 |
| 4,254,467 | 3/1981 | Davis et al. | 364/521 |
| 4,282,546 | 8/1981 | Reitmeier | 358/183 X |
| 4,308,532 | 12/1981 | Murphy | 340/723 |
| 4,330,834 | 5/1982 | Murphy | 364/521 |
| 4,354,184 | 10/1982 | Woborschil | 340/709 |
| 4,400,780 | 8/1983 | Nagao et al. | 340/731 X |
| 4,454,507 | 6/1984 | Srinivasan et al. | 340/747 X |
| 4,498,079 | 2/1985 | Ghosh et al. | 340/721 X |
| 4,542,376 | 9/1985 | Bass et al. | 340/721 X |
| 4,561,659 | 12/1985 | Redfield et al. | 340/721 X |
| 4,613,946 | 9/1986 | Forman | 364/521 X |

FOREIGN PATENT DOCUMENTS 2473206 10/1981 France .

OTHER PUBLICATIONS

IBM Technical Disclosure Bulletin, vol. 24, No. 2, Jul. 1981, pp. 1072–1074; D. F. Bantz et al; "Strategy for Fast Interaction with a Complex Display".

IBM Technical Disclosure Bulletin, vol. 25, No. 2, Jul. 1982, p. 469; M. N. Day; "Progressive Visibility Function for a Display Station Cursor".

Displays, vol. 2, No. 1, Apr. 1980; pp. 47–55; W. R. Gardner; "Interactive Display Techniques for the Tektronix 4027 Colour Terminal".

Murphy, A. S. "Picture Editing System", IBM Technical Disclosure Bulletin, vol. 20, No. 1, Jun. 1977, pp. 383–385.

Judd et al., "Microprocessor Controlled Cursors", IBM Technical Disclosure Bulletin, vol. 22, No. 5, Oct. 1979, pp. 2103–2105.

Primary Examiner—Felix D. Gruber
Assistant Examiner—Joseph L. Dixon
Attorney, Agent, or Firm—Frederick D. Poag

[57] ABSTRACT

An interactive raster-scanned display device has a microprocessor (1) and random access memory (3) which operate to issue instructions to a drawing engine (7) to cause it to load and erase image pel representation in an image buffer (9) in order to control display of images on, or removal of images from a display screen (8) in a conventional manner. A cursor control device (10) enables a user to interact by means of a cursor symbol with images on the screen. In order to reduce the demands imposed on the drawing engine during transformation of images over the screen, the system is configured so that transformation operations are performed using alternative images substituted for the full images. Each alternative image contains considerably less detail to be drawn and erased than the full image it replaces and therefore the operation is more likely to be performed at the rate desired by the user. Thus, complex graphics images containing many vectors are replaced during transformation by simple skeletal or outline drawings. If a large size cross-hair cursor is used for easy indentification on a screen, then this also is replaced by a small symbol whenever it is moved. At the end of the transformation operation, the full image and the large cursor are restored on the screen.

14 Claims, 11 Drawing Figures

_a_ FULL CROSS HAIR

_b_ ALTERNATIVE CURSOR

_c_ FULL GRAPHICS IMAGE SHOWING ALL DETAIL

_d_ SKELETAL IMAGE

_e_ CONVEX HULL BOUNDARY OF GRAPHICS IMAGE

_f_ BOUNDING BOX IMAGE FOR GRAPHICS IMAGE

FIG. 2
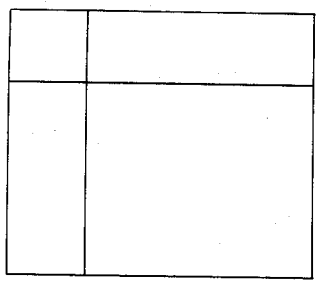
<u>a</u>  FULL CROSS HAIR
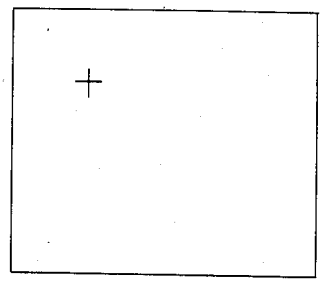
<u>b</u>  ALTERNATIVE CURSOR
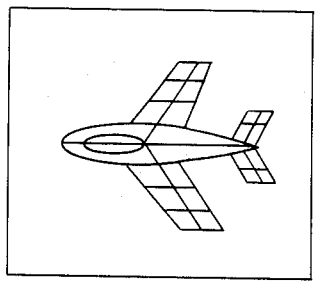
<u>c</u>  FULL GRAPHICS IMAGE
SHOWING ALL DETAIL
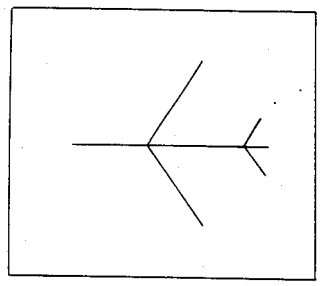
<u>d</u>  SKELETAL IMAGE
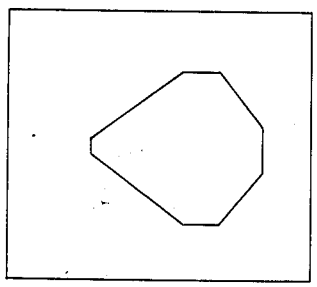
<u>e</u>  CONVEX HULL BOUNDARY
OF GRAPHICS IMAGE
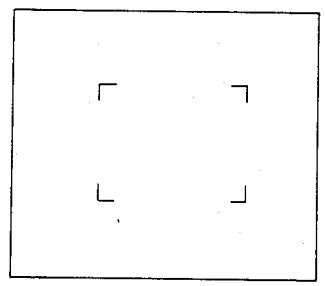
<u>f</u>  BOUNDING BOX IMAGE
FOR GRAPHICS IMAGE

IMAGE TRANSFORMATIONS ON AN INTERACTIVE RASTER SCAN OR MATRIX DISPLAY

This is a continuation of copending application Ser. No. 537,996 filed 9/30/83 and now abandoned.

BACKGROUND OF THE INVENTION

1. Field of the Invention

The invention relates to an interactive raster scanned or matrix display system of the type which permits two-way communication between a user of the system and a computer included as part of the system.

In such systems, the computer provides the control for the display so that, for example, upon receipt of signals from an input device operated by the user, a displayed picture is modified appropriately. It is desirable for the modification to occur rapidly so that to the user it appears that the picture is changing instantaneously in response to the commands. The invention relates in particular to the use of such a display system for performing image transformation on the screen including such transformation made under the direct control of a user interacting with the system by means of a cursor positioning device.

2. Description of the Prior Art

There are a variety of graphical input devices such as joysticks, tracker balls, tablets etc. available by means of which a user can identify a particular location or image on the screen. It is also possible to identify a position on the screen by using a keyboard propelled cursor. Here, a set of four keys may be assigned to step the cursor in each of the two directions vertically and horizontally. The effectiveness of these input devices depends on the use of visual feedback to the user provided by a cursor displayed at the screen coordinates defined by the coordinate outputs of the device. By controlling movement of the device, the user can steer the cursor around the screen.

In many interactive applications provision is made for displayed images on the screen to be transformed by the user. The procedure involved includes the user moving a cursor to overlay a point on the image in question and then issuing a signal by means of an assigned keybutton for example, to notify the computer that a transformation function is to be performed on the image, pointed to by the cursor. The computer then operates to link the image to the cursor so that, for example, if the transformation involves moving the image across the screen, the user can drag the image to its new position simply by moving the cursor with the input device. The images to be moved may include graphics line drawings, halftone images, text or combinations of all three. A block of text to be moved may be identified by being enclosed in a box or by pointing to the start and end of the block using a cursor.

The cursor symbol on the screen can be provided by a special purpose hardware processor. However such a processor is a relatively expensive item in a low cost terminal and also limits the flexibility in terms of shape available to the user. It is therefore becoming increasingly common to generate the cursor by means of software thus enabling cursor shapes and sizes to be selected by the user to suit the application being performed.

A general interactive raster-scanned display system which is capable of making image transformations is described in SIGGRAPH-ACM Computer Graphics Vol. 13, No. 3, August 1979. Further information on such systems may be found in Chapter 12 "Raster Display Architecture" pages 479 to 503 in a text book entitled 'Fundamentals of Interactive Computer Graphics' by J. D. Foley and A. Van Dam published by Addison-Wolsey Publications Company 1982. Basically in such systems, the individual graphics images that constitute the picture on the screen are stored as individual graphic segments containing the graphic orders. Then transformations may be applied individually to a given graphics segment. This in turn can result in a 'new frame' action, that is the redrawing if necessary of all visible retained information. On a raster-scanned or matrix (e.g. gas panel) display, if there are many images visible and/or the images contain many vectors, it can take a relatively long time, amounting in some cases to several seconds, to redraw the entire picture.

This is particularly a problem on all but high function and consequently high cost systems. The problem inasmuch as it relates to moving the cursor itself across the screen can be minimized by specifying that it is of small size and simple shape so that it can be erased and redrawn repetitively at a sufficient rate to move it across the screen at the required speed. In the case of a key operated cursor this speed is determined by the automatic typing rate of the keyboard in repetitive mode.

It has been found however that when interacting with complex graphics line drawings such as integrated circuit layouts or detailed engineering drawings, a small cross-hair cursor for example can be difficult to find. Accordingly, when interacting with such complex images, it has been found to be advantageous to use a large cross-hair cursor extending from screen edge to screen edge both horizontally and vertically.

The processing power required to erase and redraw these large cursor images is not trivial and the time taken to perform each incremental repositioning can be long compared to the desired speed of interaction. Clearly, the problem is even worse when transforming detailed and complex images and worst of all when the transformations are performed under user control where both image and cursor are required to be moved across the screen together.

SUMMARY OF THE INVENTION

According to the invention, an interactive raster-scanned display system includes a microprocessor controller and random access store operable to issue control signals to a drawing engine in order to display a full image on a display screen, said engine being operable in image transformation mode repetitively to erase and redraw such an image so as to change its position and/or shape in response to real-time commands received by said microprocessor from an interactive input device, characterized in that, in order to reduce the demands imposed on the drawing engine during real-time image transformation, control means are provided operable in image transformation mode to substitute for said full image required to be transformed, an alternative image representing said full image but containing less detail to be drawn, and on completion of said transformation to replace said alternative image by said full range.

In order that the invention may be fully understood, preferred embodiments thereof will now be described by way of example with reference to the accompanying drawings.

BRIEF DESCRIPTION OF THE DRAWINGS

In the drawings:

FIG. 2a-2f shows a number of typical images as they might appear on a screen during the performance of transformations in accordance with the invention;

DETAILED DESCRIPTION

Figure 1:
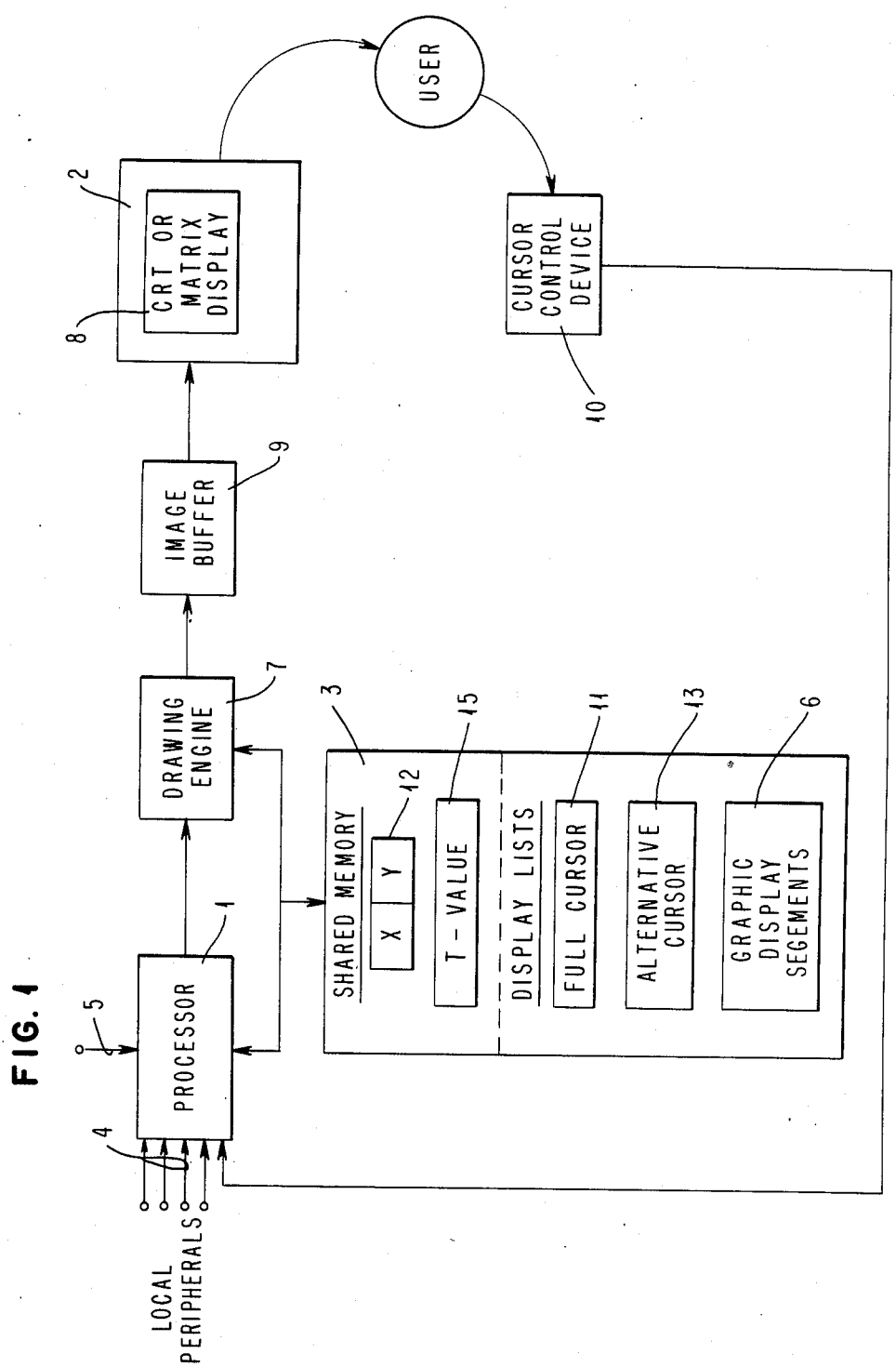
FIG. 1 shows in simplified block form a general purpose raster graphics display system to which the present invention is applied.

The basic structure of a general purpose graphics display system on which the present invention is implemented is shown in FIG. 1. Such a system is well known in the art and is typical of the type of system described in the referenced chapter of the aformentioned text book by Foley and Van Dam. The basic components of a raster display system are an image creation system, an image storage system, and an image display system, all of which receive commands through an interface of a general purpose computer. Thus in the display system shown in FIG. 1, a microprocessor 1 loads display lists of images to be displayed on a visual display unit (VDU) 2, into allocated space in a random access memory 3.

The display lists are in the form of graphic display segments and are provided in known manner by the 'application' being run, over input lines 4 from local peripherals for example, or perhaps over a communications line 5 from a remote unit. The display lists of images are shown as having been allocated a block 6 of memory 3. It will be understood however that the allocation of space in such a system is under program control and the precise location of individual lists at any instant in time is of no interest. When a particular image is required to be displayed, the microprocessor points to the corresponding display list in block 6, and issues drawing commands to a drawing engine 7 which generates a bit map of the image to be displayed pel by pel on the screen 8. The bit map is loaded into an image refresh buffer 9 which is sampled row by row in synchronism with the line scan of the VDU2 so that the resulting image displayed on the screen 8 is refreshed at the required frame rate. The VDU may be either a cathode ray tube display device or a matrix addressed device such employing for example a gas panel.

In order to interact with the image on the screen, a user is provided with cursor control device 10 by means of which a cursor symbol can be moved from point to point over the screen. The cursor control device may take any of several forms for example a tablet, a trackball, joystick or indeed special purpose cursor keybuttons on a keyboard. In all cases, a means is provided, usually in the form of a button associated with the device, to enable a user to signal to the application program that the cursor symbol is at a position of interest on the screen. The cursor symbol may be provided by special hardware or, as is becoming increasingly common, in the form of a display list defining the cursor shape stored in allocated space in the image storage system. A full cursor display list is shown stored in block 11 in memory 3 and is displayed in the same way as other images by the drawing engine 7 generating a corresponding bit map of the cursor symbol which is loaded into the bit buffer 9 where it is held during display on the screen.

It is generally required that the cursor symbol is displayed on the screen at all times and for it to be superimposed on existing images already on display on the screen. Techniques for achieving this are well known and, since they have no relevance to the present invention, will not be described herein. The mechanism for moving a cursor across the screen, although in itself well known, has some relevance to the present invention and will be now described briefly.

The cursor position on the screen is defined by coordinate values supplied by the associated cursor control device 10. The processor 1 enters these coordinate values into a predetermined region of memory 3 set aside for the purpose and for convenience identified as X and Y position registers 12. A stream of new coordinate values are sent to the microprocessor as a result of a repositioning of the cursor control device by an operator. In practice, a new coordinate value is transmitted following for example each incremental movement of the cursor control device or alternatively at predetermined time intervals determined by the system clock. The coordinate values arriving in succession form a queue in the microprocessor and are processed one at a time in the order in which they are received. The processing steps, which are quite standard, involve entering the new coordinate value from the head of the queue into the X, Y position registers 12 in memory 3, calculating the transformation using the standard linear transformation matrix for linear displacement, and sending commands to the drawing engine 7 to cause it to erase the cursor symbol at the current screen position and redraw it at the calculated pel positions specified by the new coordinate position defined by the contents of the X, Y position register. Provided the drawing engine is capable of erasing and redrawing the cursor symbol at a rate equal to or greater than the rate at which the new incremental position coordinates are received by the microprocessor, then it appears to the user, that the cursor symbol changes instantaneously in repsonse to the cursor commands entered by means of the control device 10.

The cursor can be used interactively in conventional manner to identify positions on the screen at which new images are to be displayed, or to 'pick' and transform existing images on the screen. The techniques involved for performing their operations are well known in the art and involve repetitive erasure and redrawing not only the cursor symbol but also the image being transformed.

When interacting with complex images containing many lines, it is desirable to use a large cursor symbol extending from screen edge to screen edge so that it is easily identified and less likely to become lost. In low cost display systems with limited processing power, the process of erasing and redrawing such a cursor symobl can take a relatively long time compared with the rate at which the positioning information is received from the cursor control device. The effect is that requests for rapid cursor repositioning may not be met and the cursor movement lags behind the input device. This can result in overshoot and lead to general dissatisfaction of the user. When performing image transformation for example, dragging, scaling, rotation, or even more complex transformations such as rubber banding an image on a screen, the effect can be very much worse with each erasure and redrawing operation taking several seconds compared with a typical incremental move rate of a cursor which calls for fity such operations a second.

The present invention is aimed at reducing these problems in a low cost terminal where computing power is somewhat limited. From the human factors point of view, it is important that the cursor remains easily identifiable and does not impede the interactive nature of the process by lagging behind its intended position. Also from the human factors point of view it would be a considerable advantage to be able to perform graphics or image transformation at the keying rate for example of a key controlled cursor.

In a system operating in accordance with the present invention, a cursor is normally drawn large and is therefore easily identifiable. Then when the cursor is transformed, the system operates automatically to replace the full cursor with an alternative cursor image which has less detail to be drawn and therefore can be transformed at a faster rate. The two cursor images full and alternative such as shown in FIG. 2 as screen a and b respectively may be chosen by the program itself, or they may be selected from images supplied by the user, or the application program. The alternative cursor is shown stored as a display list in block 13 of memory 3.

The problem of 'losing' the cursor image is considerably reduced by judicious choice of the original full cursor image and since this full image will generally be large it can be found easily and since its position has been noted by the user before movement is requested, tracking the alternative small cursor which automatically replaces the full cursor during the movement presents no problem. When the cursor is again stationary and no outstanding requests for cursor motion have been received by the microprocessor 1 for a predetermined period, for example 1.5 seconds, the alternative cursor is automatically replaced by the original full cursor.

Figure 3:
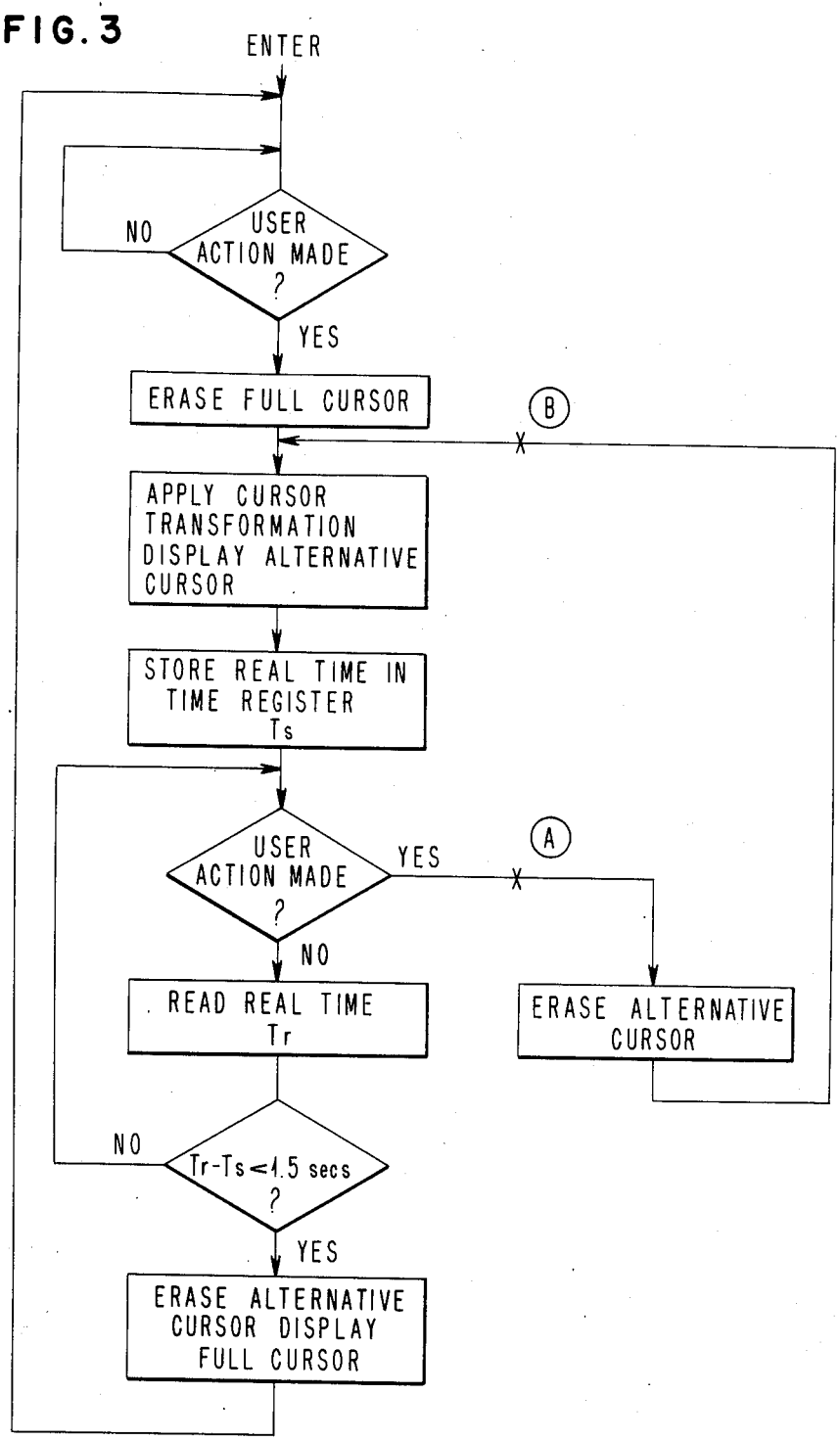
FIG. 3 shows a flow diagram setting out the individual steps for invoking an alternative cursor operation performed by a display system in accordance with the invention.

The flow diagram setting out the sequence of steps performed by the system during a cursor movement across the screen is shown in FIG. 3. Prior to a cursor move operation, the full cursor specified by the full cursor display list 11 is displayed at the current position on the screen. As soon as a cursor move request is received from the cursor control device 10, the microprocessor instructs the drawing engine 7 to erase the full cursor. The microprocessor issues commands to the drawing engine so that it re-draws at the new calculated position with the incremental transformation applied, not the full cursor, but the alternative cursor defined by alternative cursor display list 13.

If user action continues to supply move requests to the microprocessor, then the alternative cursor is erased, the transformation determined by the drawing engine and the alternative cursor redrawn at the transformed position. The process cycles around this loop for as long as move requests are supplied. After a predetermined time interval following the last move request, the alternative cursor is replaced once again by the full cursor. This requires the time interval from the last alternative cursor move to be monitored. This is achieved by the microprocessor entering the real time (derived from the system clock) at which the last alternative cursor move was made into predetermined storage locations of memory 3 conveniently referred to as time register 15. In the absence of user action requiring further alternative cursor movement, the real time (which of course is continually incremented at the clock rate of the system) is read and compared with the stored value of the real time in register 15. A threshold is set for the time lag, which is regarded as being sufficiently long since receipt of the last alternative cursor move, so that it can be assumed that the cursor move is complete. In the practical example chosen with the internal clock running at the frame refresh rate of the display (approximately 50 times/second), a lapsed uninterrupted period of 75 counts indicating a time lapse of 1.5 seconds since the last alternative cursor move is considered to be adequate. As soon as this threshold is reached the alternative cursor is erased and replaced by the full cursor which remains displayed until a new cursor move operation is requested.

The system so far described can be modified to operate in catch-up mode should the motion of the cursor on the screen fall behind the motion requesting input. This is most likely to occur during the erasing of the full image at the start of a transformation operation which takes a relatively long time. A part flow diagram shown in FIG. 4 details the modification to the system and is intended to replace the portion of the flow diagram in FIG. 3 lying between the point A and B. A system operating in catch-up mode reads all the input requests for cursor motion and transforms the cursor image in one step to the position it would have been in, had the program been able to keep up.

So far the operation has been concerned with simple translational movement of a cursor across the screen. The same procedure may also be adopted for performing translations or other transformations of the displayed images provided by the application. Thus for example whenever a transformation is required of an image, which would by virtue of its complexity impose a time penalty on the operation, a simplified image is substituted during the period of transformation. When the transformation has been completed, the original complex image is returned.

Figure 4:
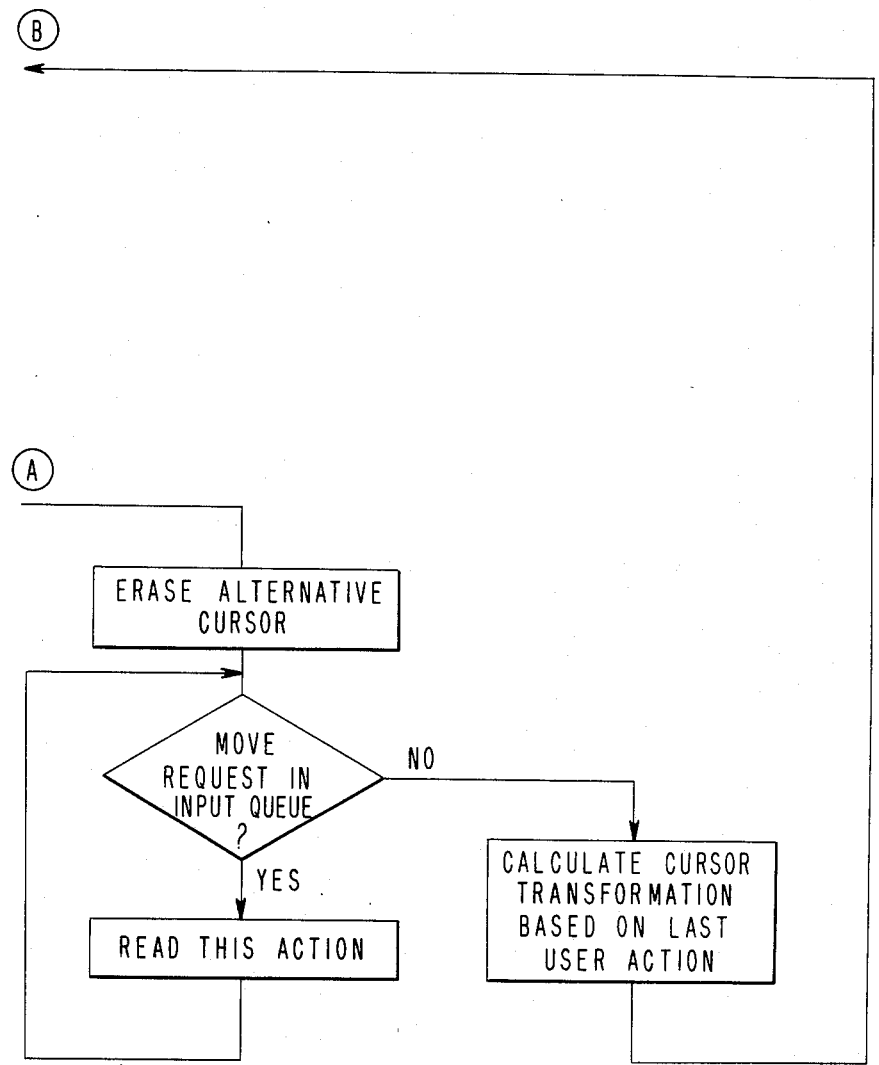
FIG. 4 shows a modification to the flow diagram in FIG. 3 to enable the display system to operate in catch-up mode should the cursor screen position fall behind the user defined position.

In order to perform this operation as set out in the flow diagram of FIG. 3, or as modified by the part flow diagram in FIG. 4, additional display lists representing simple substitute images for the complex images must be provided by the application. Those complex images provided with alternative images are marked by the application in a way detectable by the microprocessor. Thereafter, whenever transformations of images identified by the mark are called for, the microprocessor adopts the procedure as described in the flow diagram of FIG. 3 and 'points' to the full image or alternative partial image as appropriate. An example of a complex image is shown as screen c in FIG. 2 and an alternative simple skeletal image for substitution during transformation is shown as screen d. Clearly the nature of the alternative image will be selected to suit each individual case and may take any of several forms. Other typical alternative images are shown in FIG. 2 where screen e represents a convex hull boundary of a three dimensional object's image, and screen f represents a simple rectangular frame that would enclose a full image.

For the sake of simplicity the example described dealt with a simple translation of a 2-dimensional image, however quite clearly, the invention is equally applicable for performing other 2 dimensional transformations such as scale change and rotation. In these cases additional registers up to six in number would need to be defined in the random access memory to hold the linear transformation elements used during the calculations. The transformation matrices are described in detail in the aformentioned text book by Foley and Van Dam at page 254. Equally the invention is applicable to transforming 3-dimensional images, although in this case up to twelve elements.

The disadvantage of the method of implementing the invention described so far is that the alternative images need to be provided beforehand by the application. The images are therefore invariant and accordingly are unlikely to be the most appropriate for each and every transformation. For example, with all but the key controlled cursor devices, the speed at which a cursor and its attached image are moved around the screen is determined by the user. If the movement is fast, even the alternative image may be too large for the drawing engine to process at the desired rate. Conversely, if the required rate of movement is slow, then even if the drawing engine is capable of processing the full image, the procedure will still automatically substitute the alternative image even though it may under the circumstances be unnecessary.

The second embodiment of the invention utilizes an interrupt system which overcomes this problem by enabling the system to specify its own alternative image by using only those vectors of the full image that can be drawn and erased in the available time interval between move commands. In this case, the display list of vectors presented for an image is ordered by the user so that the most important features of the image are specified, and hence drawn, first. Thus for example the ordering of vectors forming the skeletal image on screen c of FIG. 2 may be such that those vectors forming the skeletal image on screen d are drawn first should the rate of transformation be such that an alternative image is required.

Figure 5:
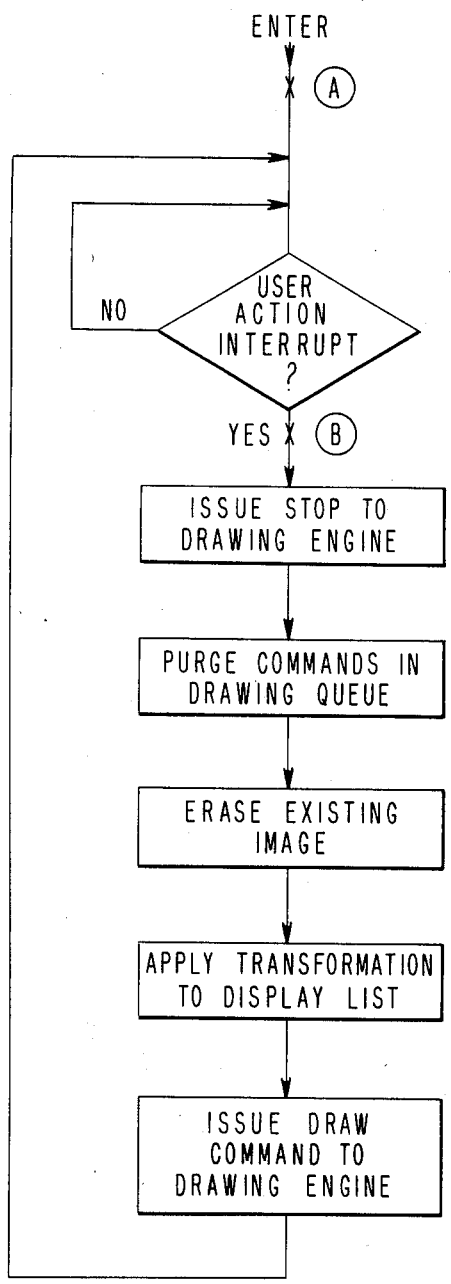
FIG. 5 shows a flow diagram in which the detail of the alternative image is selected automatically by the display system itself to suit the available processing power.

The flow diagram setting out the sequences of steps for performing image transformation operations with the system configured according to the second embodiment of the invention is shown in FIG. 5.

Following the receipt of a user action interrupt from the cursor control device 10, resulting in the appearance of a move request in the input queue, the microprocessor 1 issues a STOP command to the drawing engine 7. Since it is important to save as much time as possible, any remaining drawing commands on the drawing queue currently being processed by the drawing engine are purged from the system. An instruction is issued to the drawing engine to erase the existing image from the screen. The transformation specified by the new coordinate values in register 13 is applied to the display list and a new DRAW command is issued to the drawing engine 7. The engine then draws as many vectors as it can in the new incrementally transformed position until another move request appears in the input queue from device 10. This is regarded by the system as another user interrupt and the whole process is repeated.

Figure 6:
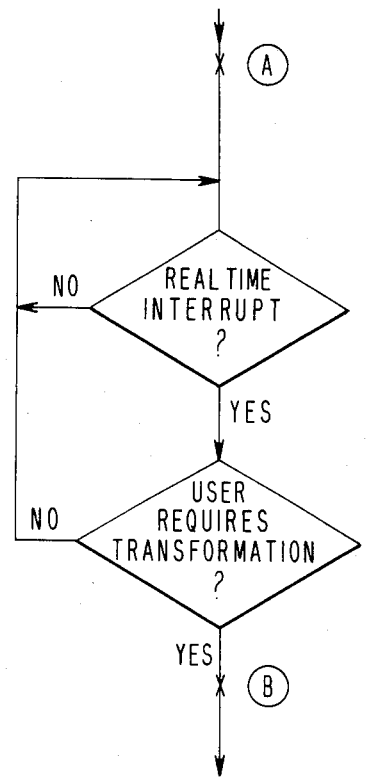
FIG. 6 shows a modification of the procedure set out in the flow diagram of FIG. 5 to synchronize the operation with the frame frequency of the raster visual display unit of the system.

It is desirable from the human factors point of view for drawing of an image on the screen to be synchronized with the frame scan mechanism. To achieve this, the display system is modified as shown by the part flow diagram shown in FIG. 6 which replaces the portion of the flow diagram of FIG. 5 lying between point A and B. In this variation, a system real time interrupt occurs at the start of every frame scan (i.e. 50 times/sec). At each interrupt, the input queue is interrogated to see whether there is any outstanding user action waiting to be processed. If a move request is found then the remaining procedure detailed in the flow chart of FIG. 5 and described above is followed.

This mechanism tied to the frame synch of the terminal would result in difference alternative images being drawn on different speed terminals. However, it would not require the code for frame selection to be modified when it is transported to a new, different speed terminal, thus providing a degree of device independence.

Finally, a further advantage of displaying alternative images is that since these can be made small, a correspondingly small amount of image buffer space is required for its display. Further, since this space is small, its use can be reasonably special cased, so as to recover the space when the image is erased. This may be done by saving the relevant contents of the bit buffer before the image is drawn and then restoring them when the image is later erased.

What is claimed is:

1. An interactive raster-scanned display system including a microprocessor and random-access store operable to issue control signals to a drawing engine in order to display a full image on a display screen, said engine being arranged in operation in image transformation mode repetitively to erase and redraw such an image so as to change its position and/or shape in response to real-time commands received by said microprocessor from an interactive input device, characterized in that, in order to reduce the demands imposed on the drawing engine during real-time image transformation, control means are provided in said system arranged in operation in image transformation mode to substitute for said full image required to be transformed, an alternative image representing said full image but containing less detail to be drawn, and on completion of said tranformation to replace said alternative image by said full image, in which said control means is arranged in operation to, by and substantially upon receipt of a first command from said input device, invoke image transformation means to cause said engine to erase the full image to be transformed currently on display and thereupon to draw, incrementally transformed as required by said first command, said alternative image, said control means being further arranged in operation to, in response to receipt of subsequent commands, cause said engine repetitively to erase and redraw the alternative image with incremental transformation as required in turn by each of said subsequent commands, and in which means are provided to form in an input queue said transformation commands from said input device and to process the queued commands in order of arrival by said microprocessor, said control means being operable by and substantially upon receipt of a subsequent transformation command before the current drawing operation of the alternative image is complete to cause said engine to erase the partially drawn alternative image and to redraw said alternative image transformed as required by the most recently received command in said queue.

2. An interactive raster-scanned display system as claimed in claim 1 in which said processor is arranged in operation to store said full and alternative images in the form of vector display lists in available allocated space in said random access store.

3. An interactive raster-scanned display system as claimed in claim 1, in which said system is arranged in operation to synchronize start of an alternative image draw operation by said engine with the start of a new frame scan of said display screen.

4. An interactive raster-scanned display system including a microprocessor and random-access store operable to issue control signals to a drawing engine in order to display an image on a display screen, said engine being arranged in operation in transformation mode repetitively to erase and redraw such an image so as to change its position and/or shape in response to real-time commands received by said microprocessor from an interactive input device, characterized in that, in order to reduce the demand imposed on the drawing engine during real-time image transformation, said microprocessor is arranged in operation to store said image in said random access store as a vector display list ordered for selection by said engine during a drawing operation in a predetermined sequence of vectors, the arrangement of storage being such that those vectors at the head of the list define the general shape of the image whereas those vectors at the end of the list define details of the image, and control means are provided arranged in operation to, by and substantially upon receipt by said microprocessor of each transformation command from the input device, cause said engine to erase the image currently on display and to commence to re-draw said image from said ordered list incrementally transformed as required by said transformation command, said control means being arranged in operation whereby the drawing operation of each re-drawn image continues until receipt of a subsequent transformation command whereupon the process is repeated.

5. An interactive raster-scanned display system as claimed in claim 4, including means for forming into a queue any multiple transformation commands from said input device received during an image processing operation by said engine and said control means being operable by and substantially upon the end of such a processing operation to cause said engine to commence to re-draw said image as aforesaid transformed as required by the most recently received command in said queue.

6. An interactive raster-scanned display system as claimed in claim 5, including means by which start of an image draw operation by said engine is synchronized with the start of a new frame scan of said display screen.

7. An interactive raster-scanned display system including a microprocessor and random-access store operable to issue control signals to a drawing engine in order to display a full screen cross-hair cursor at a predetermined position on a display screen and further to display a full image of an object, the position of which on the screen is determined with reference to the position of the cursor, an input device responsive to user action to issue cursor position commands to said microprocessor effective in image transformation mode to move the cursor together with the image, or part of the image, progressively over the screen from one location to another, the movement of the cursor over the screen and the corresponding movement and/or change of shape of the image being effected by said drawing engine operating under microprocessor control repetitively to erase and redraw the cursor and the object image as required by the nature of the transformation being performed characterized in that in order to reduce the demands imposed on the drawing engine during such real-time transformation, control means are provided in said system arranged in operation to, upon and during execution of said image transformation mode to substitute for said full image to be transformed an alternative image representing said full image and for said full screen-cross-hair cursor an alternative cursor defining the same screen position as said full screen cross-hair cursor, said substitute image and substitute cursor each containing less detail to be drawn than the corresponding full image and full cursor they respectively represent, and said control means being further arranged in operation to, on completion of said transformation, replace the alternative image by said full image and said alternative cursor by said full screen cross-hair cursor.

8. An interactive raster-scanned display system as claimed in claim 7, in which said system is arranged in operation whereby said cursor position commands from said input device form an input queue and are processed in order of arrival by said microprocessor, said control means being operable by and upon receipt of a subsequent cursor position command before the current drawing operation of the alternative image and alternative cursor is complete to cause said engine to erase the partially drawn alternative image and alternative cursor and to redraw said alternative image image and alternative cursor transformed as required by the most recently received command in said queue.

9. An interactive raster-scanned display system as claimed in claim 8 including means arranged in operation to monitor the elasped time from receipt by said microprocessor of the most recent command from said input device, this arrangement being such that the current transformation is regarded as having been completed when said elapsed time exceeds a predetermined value.

10. An interactive raster-scanned display system as claimed in claim 9, in which said system is arranged in operation whereby said full and alternative images and said full screen cross hair cursor and said alternative cursor are all stored in the form of vector display lists in available allocated space in said random access store.

11. An interactive raster-scanned display system as claimed in claim 10, in which said control means includes a pointer mechanism arranged in operation to identify the location of a display list of a full image to be displayed and to identify the location of a display list of the associated alternative image upon invocation or tranformation of said full image.

12. An interactive raster-scanned display system as claimed in claim 7 including means arranged in operation to monitor the elapsed time from receipt by said microprocessor of the most recent command from said input device, the arrangement being such that the current transformation is regarded as having been completed when said elapsed time exceeds a predetermined value.

13. An interactive raster-scanned display system as claimed in claim 12, in which said system is arranged in operation whereby said full and alternative images and said full screen cross hair cursor and said alternative cursor are all stored in the form of vector display lists in available allocated space in said random access store.

14. An interactive raster-scanned display system as claimed in claim 13, in which said control means includes a pointer mechanism arranged in operation to identify the location of a display list of a full image to be displayed and to identify the location of a display list of the associated alternative image upon invocation or transformation of said full image.

* * * * *